US010025837B2

(12) United States Patent
Cherwonka et al.

(10) Patent No.: US 10,025,837 B2
(45) Date of Patent: Jul. 17, 2018

(54) SYSTEMS AND METHODS FOR INTELLIGENT DATA PREPARATION AND VISUALIZATION

(71) Applicant: Dundas Data Visualization, Inc., Toronto (CA)

(72) Inventors: James John Cherwonka, Toronto (CA); Adrian Serban Dobrin, Toronto (CA); Troy A. Marchand, Nobleton (CA); Terrence Eugene Sheflin, Mount Abert (CA); Robert Eric Siklos, Toronto (CA); Mariana Stoica-Constantin, Richmond Hill (CA)

(73) Assignee: Dundas Data Visualization, Inc., Toronto, Ontario (CA)

( * ) Notice: Subject to any disclaimer, the term of this patent is extended or adjusted under 35 U.S.C. 154(b) by 332 days.

(21) Appl. No.: 14/837,036

(22) Filed: Aug. 27, 2015

(65) Prior Publication Data
US 2016/0378843 A1 Dec. 29, 2016

Related U.S. Application Data

(60) Provisional application No. 62/192,651, filed on Jul. 15, 2015, provisional application No. 62/184,749, filed on Jun. 25, 2015.

(51) Int. Cl.
*G06F 17/30* (2006.01)
(52) U.S. Cl.
CPC .. *G06F 17/30563* (2013.01); *G06F 17/30312* (2013.01); *G06F 17/30554* (2013.01)

(58) Field of Classification Search
CPC ................................. G06F 17/30563
See application file for complete search history.

(56) References Cited

PUBLICATIONS

Dundas. "Introduction to Data Cubes." YouTube, published Nov. 10, 2014, uploaded Nov. 3, 2014. https://www.youtube.com/watch?v=axCPzB_baL8.*

* cited by examiner

*Primary Examiner* — Syed H Hasan
(74) *Attorney, Agent, or Firm* — Rowand LLP (57) ABSTRACT

Real-time data visualization systems and methods are described. A data cube may be generated, wherein the data cube comprises a set of transforms to be applied to two or more data elements from disparate data sources, wherein processing of the data cube is to result in a data cube result having a plurality of measures and one or more hierarchies. A user may build a visualization, which produces a visualization request associated with the data cube, the visualization request specifying one or more of the measures and hierarchies of the data cube. The system identifies, based on the visualization request, one or more transforms within the data cube to remove from the data cube for the purpose of the visualization request to produce a modified data cube, and carries out the transforms of the modified data cube to produce a modified data cube result, which is exposed to the client-side visualization processor for rendering the visualization.

21 Claims, 8 Drawing Sheets

SYSTEMS AND METHODS FOR INTELLIGENT DATA PREPARATION AND VISUALIZATION

FIELD

The present application generally relates to data analysis and processing.

BACKGROUND

Existing data analytics systems (e.g. dashboard and reporting systems) typically require input data to be prepared before it can be visualized or manipulated. For example, data is first read from input sources and then the read data is cleansed, joined, or otherwise transformed before it can be manipulated and visualized. The tools used for preparation of data are often termed extract-transform-load (ETL) tools. These typically involve significant manual operation and technical expertise to set up and configure properly. Once the data has been prepared using ETL tools it is then stored in a data warehouse for use by visualization systems.

Existing analytic applications and systems allow users to select measures and dimensions of interest and perform analytical operations such as consolidation (roll-up), drill-down, and complex filtering across an arbitrary number of hierarchies or dimensions (i.e. "slicing-and-dicing"). Such systems not only require input data to be prepared but also loaded into a multidimensional dataset or OLAP cube before any data analysis can occur.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

The present application describes a method of real-time data visualization. The method includes receiving selection of two or more data elements from one or more data sources; generating a data cube, wherein the data cube comprises a set of transforms to be applied to the two or more data elements, the set of transforms including a select transform for each of the two or more data elements, one or more operator transforms, and a result transform, and wherein processing of the data cube is to result in a data cube result having a plurality of measures and one or more hierarchies; receiving a visualization request associated with the data cube, the visualization request specifying one or more of the measures and hierarchies of the data cube; identifying, based on the visualization request, one or more transforms within the data cube to remove from the data cube for the purpose of the visualization request to produce a modified data cube; carrying out the transforms of the modified data cube to produce a modified data cube result; obtaining said one or more of the measures and hierarchies from the modified data cube result based on the visualization request; and displaying said one or more of the measures and hierarchies as a visualization.

In another aspect, the present application describes a data visualization system. The system includes a plurality of data sources and a server. The server includes a network connection to a client device to receive selection of two or more data elements from one or more of the data sources, and to receive a visualization request, and a data cube processor to generate a data cube, wherein the data cube comprises a set of transforms to be applied to the two or more data elements, the set of transforms including a select transform for each of the two or more data elements, one or more operator transforms, and a result transform, and wherein processing of the data cube is to result in a data cube result having a plurality of measures and one or more hierarchies. The visualization request is associated with the data cube and specifies one or more of the measures and hierarchies of the data cube. The data cube processor is to identify, based on the visualization request, one or more transforms within the data cube to remove from the data cube for the purpose of the visualization request to produce a modified data cube, and to carrying out the transforms of the modified data cube to produce a modified data cube result. The client device obtains said one or more of the measures and hierarchies from the modified data cube result based on the visualization request and displays said one or more of the measures and hierarchies as a visualization.

In yet a further aspect, the present application describes non-transitory computer-readable media storing computer-executable program instructions which, when executed, cause a processor to perform the described methods.

Other aspects and features of the present application will be understood by those of ordinary skill in the art from a review of the following description of examples in conjunction with the accompanying figures.

Figure 1:
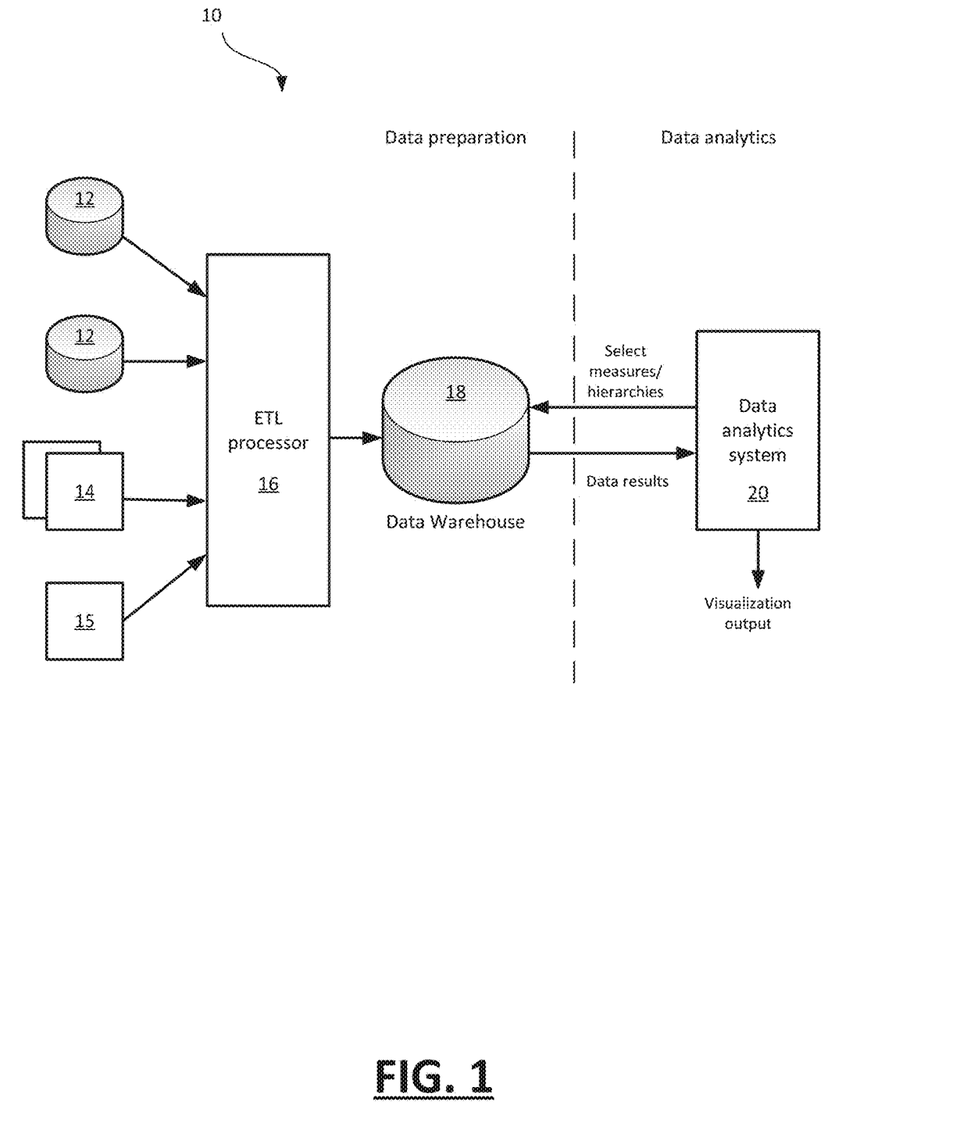
FIG. 1 shows, in simplified block diagram form, a typical business intelligence (BI) system.

Reference is first made to FIG. 1, which shows, in simplified block diagram form, a typical business intelligence (BI) system 10. The typical BI system 10 is divided into a preparation stage and an analytics stage. The preparation stage involves integrating data from various sources and preparing the data for later analysis by the analytics stage. This preparation is typically termed extract-transform-load (ETL). ETL involves extracting data from data sources systems, transforming the data through a variety of possible operations, and then loading the data into a storage area. In the BI system 10 shown in FIG. 1, the source systems include various databases 12, files 14, or web services 15.

The BI system 10 includes an ETL processor 16, which performs the functions of extracting data from the databases 12 and/or files 14, and applying transforms to the data. The transform may include data cleansing, which may include detecting and removing duplicates, rejecting anomalies, and other validation operations. The transforms may also include translating, encoding, sorting, joining, aggregating, disaggregating, and splitting, as examples. The resulting cleansed and transformed data is then loaded into a data warehouse 18. The data warehouse 18 may include historical data that is periodically updated by the ETL processor 16, such as every week, day, or hour, depending on operational requirements.

The analytics stage of the BI system 10 includes a data analytics system 20, which serves as an access interface for selecting and viewing data from the data warehouse 18. The data analytics system 20 may provide visualization tools that enable users to select certain measures and dimensions and which then retrieves those measures and dimensions from the data warehouse 18 and prepares and outputs a visualization of that data, whether in the form of reports, charts, graphs, or other outputs.

The configuration and implementation of the ETL processor 16 is typically restricted to highly-skilled database and analytics staff. Typical users, should they wish to develop a report or other visualization that requires a change in the data extracted or the nature of the transforms applied need to have one of the skilled staff reconfigure the ETL processor 16 to make such a change and to then run the ETL process again to update the data warehouse 18 before such data would be available for visualization.

System Overview

Figure 2:
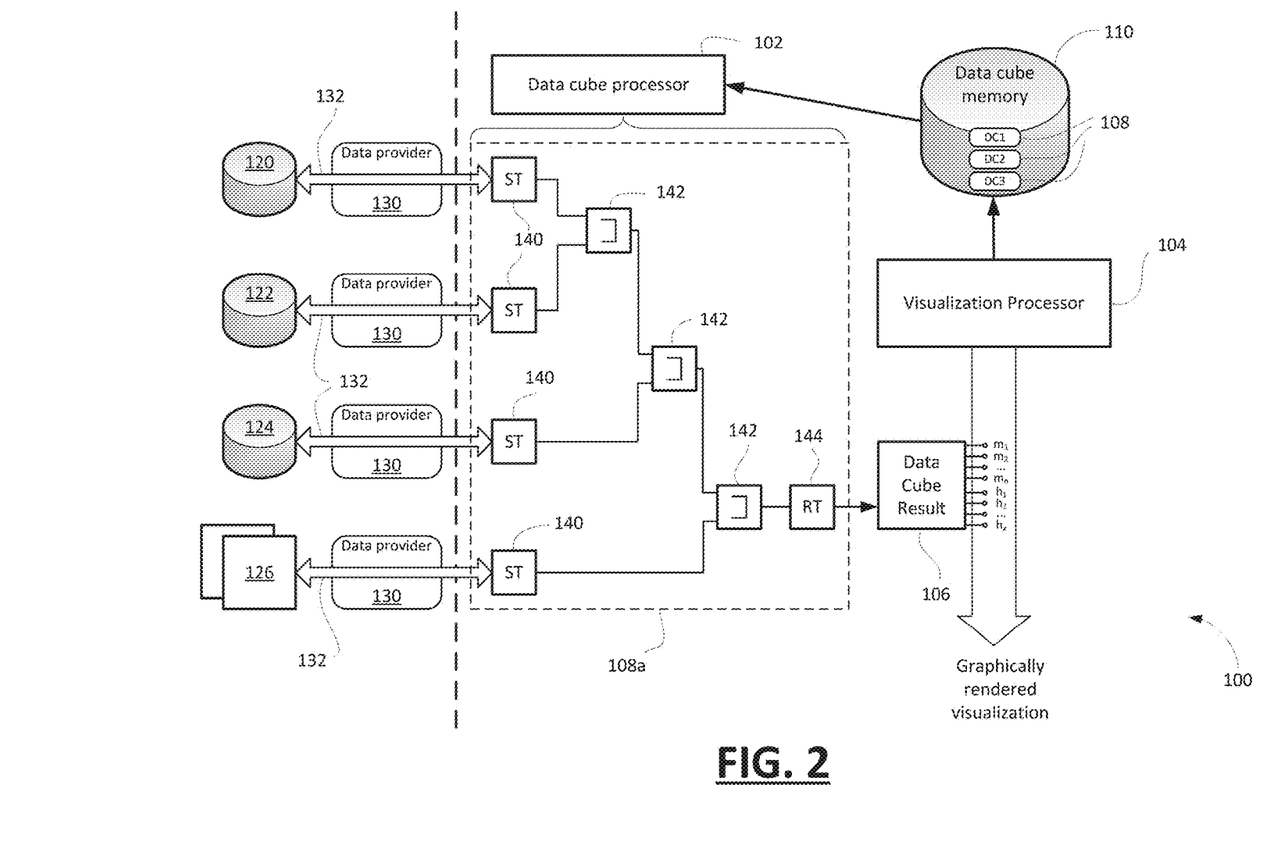
FIG. 2 shows, in block diagram form, a real-time data preparation and analytics system.

Reference is now made to FIG. 2, which shows, in block diagram form, a real-time data preparation and analytics system 100. The system 100 includes a visualization processor 104 to generate the data visualization requested by a user. The visualization processor 104 obtains data from a dynamically-generated real-time data cube result 106. The system 100 also includes a data cube processor 102 for generating the data cube result 106 "on the fly" as the data is requested by the visualization processor 104 for display. The data cube processor 102 carries out the ETL functions normally carried out in building a data warehouse but does so on a dynamic basis and using certain optimizations derived from the specific request from the visualization processor 104, as will be described in greater detail below.

The system 100 includes a data cube memory 110 storing a plurality of data cubes 108. Each data cube 108 is a specified set of data sources and ETL transforms for extracting, transforming and loading data from those data sources to create a specific data cube result 106. Each data cube may be created and manipulated by a user of the visualization processor 104 through selecting particular data sources or measures/hierarchies from those data sources and specifying (automatically or through user input) transforms for joining, sorting, or otherwise manipulating the extracted data. The data cube 108 specifies these transforms (may also be referred to as the "data process"), as will be explained further below.

When a user builds a visualization, the user may specify the data cube 108 to be used as the source for the visualization (alternatively, the visualization may be created through the user selection of data sources and measures/hierarchies, based upon which the system 100 builds a corresponding data cube 108 in the background). The building of a visualization involves selecting particular measures and/or hierarchies as well as other parameters, such as, for example, a chart or graph type. Accordingly, the visualization request generated by the user in building a visualization may include specific measures and/or hierarchies selected from the data cube 108 for inclusion in the visualization. The specified measures and/or hierarchies of a visualization request may also be termed a "metric set" in some instances.

A visualization request causes the data cube processor 102 to optimize the specified data cube 108 (in particular, optimize the data process to generate an optimized data cube) and then to extract the source data and process the transforms of the optimized data cube to produce the data cube result 106. The data cube result 106 will contain the requested measures/hierarchies, and may contain additional measures and hierarchies. The visualization processor 104 generates graphical results data from the requested measures/hierarchies supplied by the data cube result 106.

The system 100 may draw data from one or more sources of varying types having structured or unstructured data. Example data sources may include relational databases 120, OLAP databases 122, spreadsheets 124, other files 126, or any other structured or unstructured data source.

Data providers 130 provide the mechanisms for interrogating the data sources 120, 122, 124, 126. Data providers 130 may be APIs, query languages, other general mechanisms by which one accesses and extracts data from a particular type of data source. For example, if the data source is a relational database of a particular vendor, then the data provider 130 for that data source may be the structured query language used to extract data from that type of a database. Each data source has a data connector 132, which is an object created within the system 100 that specifies settings for connecting to a specific data source. A data connector 132 may specify the type of data provider 130 used for that data source and various connection or authentication properties specific to that data provider 130 and/or data source.

It will be noted that the system 100 does not, in this embodiment, include a data warehouse (in some instances, the system 100 may provide the option of warehousing). That is, the system 100 does not pre-process the extracted data from the data sources using an ETL processor and store the processed data in a data warehouse for later data analytics. Instead, the system 100 extracts, processes, and provides the required data based on a visualization request. The data resulting from processing a specific data cube is output/exposed as a data cube result, i.e. a multidimensional data structure containing measures and hierarchies. The visualization request specifies particular ones of the measures and hierarchies.

As mentioned, the data cube result is generated from the transforms specified in the particular data cube specified in the visualization request, as optimized by the data cube processor 102 during execution. One simplified example set of transforms for an example data cube 108*a* is illustrated in FIG. 2.

There are three classes of transforms:

1. Select transforms. These transforms are positioned at the beginning of the chain of transforms and are used to extract data from data sources through data providers. Examples include SQL Select, MDX Select, XML Select, Manual Select, and Stored Procedure Select.

2. Operational transforms. These transforms perform data manipulation operations such as union, joins, string manipulation, sorting, calculated element/members, and aggregation.

3. Result transforms. These transforms select the connector elements (e.g. columns or other data, including non-tabular data) of the data cube that are to be exposed as hierarchies and measures. Result transforms do not perform any ETL processing but they may encapsulate parameters and settings for grouping and filtering data that is ultimately displayed on the visualization.

The example data cube 108a includes a select transform 140 for each data source 120, 122, 124, 126. Operational transforms in this example include join transforms 142 that combine the data from the select transforms 140. A result transform 144 exposes the data cube results, i.e. produces or makes available the data cube result 106.

Data Cube Creation

Figure 3:
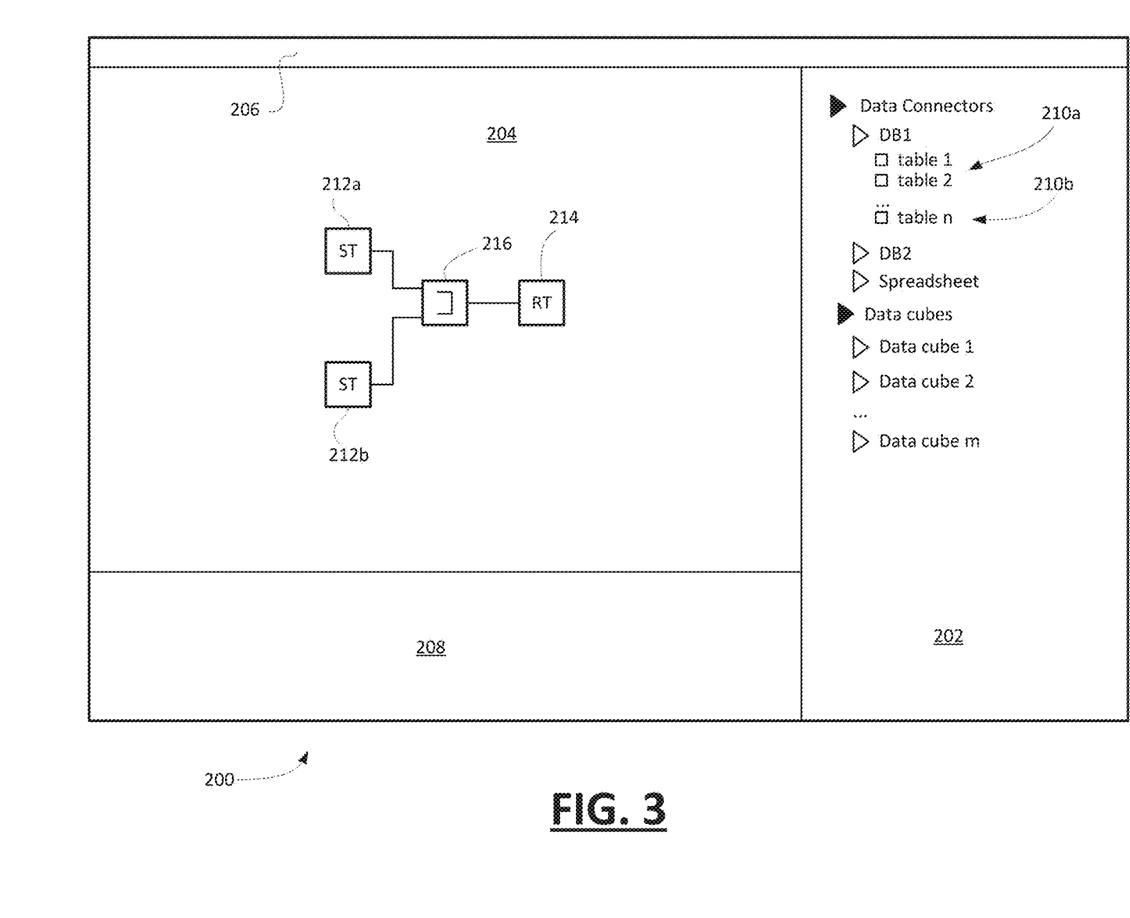
FIG. 3 shows an example data-cube-builder graphical user interface.

The visualization processor 104 provides a graphical user interface (GUI) through which data cubes may be built and manipulated. Reference is now made to FIG. 3, which shows an example data-cube-builder GUI 200.

The GUI 200 may include a data cube builder interface 204 and a data menu 202. The data menu 202 may list available data sources (i.e. sources for which there is a data connector). For each of the data sources, the various components of that data source may be listed. As an example, a data source may have a plurality of tables (or other types of data) within it. Other types may include views, stored procedures, functions, OLAP cubes, spreadsheets, etc. The data menu 202 may list other items, including data cubes previously created, and other elements for creating visualizations. The GUI 200 may further include a menu bar 206 featuring various operations and options available for user selection, and a preview area 208 within which results of the data cube being created may be previewed, for example.

Each selectable component (e.g. table or other component) contains measures and/or hierarchies. In a general sense, measures are data values or quantities, whereas hierarchies are like dimensions (more accurately, a dimension may include one or more hierarchies). As an example, product sales numbers (e.g. numbers of units sold) is a measure, and product type is a hierarchy. The product sales numbers may be broken down by product type. Hierarchies may also be multi-level. If geography is a hierarchy, a top level member may be "United States", with sublevel members of individual states, and sub-sub-level members of individual store locations or cities. Calendar data is a common hierarchy in many business data systems.

The system supports the following types of hierarchies:
1. Implicit hierarchies are defined within their associated data cube and are automatically generated by the system. For example, a Product ID column resulting from a data cube will be automatically associated with an implicit hierarchy.
2. External hierarchies are defined outside of their associated data cube. There are two types of external hierarchies:
   (a) User hierarchies are defined manually by users, or generated automatically based on a data source.
   (b) Time dimension hierarchies are date-time hierarchies which are defined according to calendar systems such as Gregorian or Fiscal. An extensibility API is provided by the system to allow third parties to add custom date-time providers based on other calendar types.

A level of an external hierarchy can be linked to one of the elements of a data cube. It is not necessary that the linking be done with the lowest level of the external hierarchy. For example, if there is monthly data consisting of information for the first day only of each month, it is possible to link to the month level of a date-time hierarchy instead of the day level.

Referring still to FIG. 3, as an example of use, a user that intends to create a new data cube may drag and drop one of the tables 210a to the data cube builder interface 204, whereupon the system generates a first select transform 212a for extracting that table from the data source. The system also automatically creates a result transform 214 connected to the first select transform 212a for displaying the results of the selection. At this initial point in the build, the data cube simply defines a pass-through of the selected data and no transformation of the data would occur. Selection of the result transform 214 may permit a preview of the measures and hierarchies that would result from the data cube. The preview area 208 may, in some embodiments, provide a preview of the actual data that results from the data cube (by having the data cube processor 102 actually carry out the data process defined in the data cube and display the full content of the data cube result, for example).

A second table 210b from the same data source or a different data source may then be dragged and dropped into the data cube builder interface 204. A second select transform 212b is created for extracting the second table 210b data from its data source.

Each of the selected tables 210a 210b, or other types of data from a data source, may include one or more measures and/or one or more hierarchies. Using a set of logical rules, the system may attempt, in some embodiments, to determine how best to incorporate the newly-added second select transform 212b to the data cube being edited. In many cases, it is likely to be incorporated using a join transform to connect it with other data. Accordingly, in some embodiments the system may create a join transform 216 prior to the result transform for linking the data of the second select transform 212b to the current data of the data cube.

The basis for the join may be determined automatically by the system. In some instances preset logic rules may be the basis for determining a suitable join. A foreign key relationship, for example, may exist between two tables that provides a basis for their joinder. In some cases, in the absence of a predefined relationship, the system may automatically determine a relationship, such as by comparing column headers to locate matches and column contents to match data types. This may be termed a 'system relationship' as opposed to a native or foreign key relationship predefined by the data source. System relationships may be modified by users to correct or alter the basis for a joinder, which results in a 'user relationship'. In terms of precedence, in one example implementation native or foreign key relationships take precedence over user relationships which take precedence over system relationships.

In one embodiment, the system includes a learning component that attempts to refine the logic rules that produce system relationships based upon changes made to create user relationships. That is, when a system relationship is proposed and is not altered by a user, the rule that resulted in creation of that system relationship is reinforced (e.g. by weighting or other learning mechanisms), whereas when a system relationship is rejected and changed by a user the rule that resulted in creation of that system relationship is weakened. In some embodiments, the system attempts to introduce and/or enhance/weaken rules based upon the user relationships created so that it learns user preferences. Any one or more of a variety of computer learning algorithms may be employed in a given implementation.

Once the data cube has been created and named, it may be "checked in" or saved for future use by anyone wishing to use it as the basis for creating a visualization.

Figure 5:
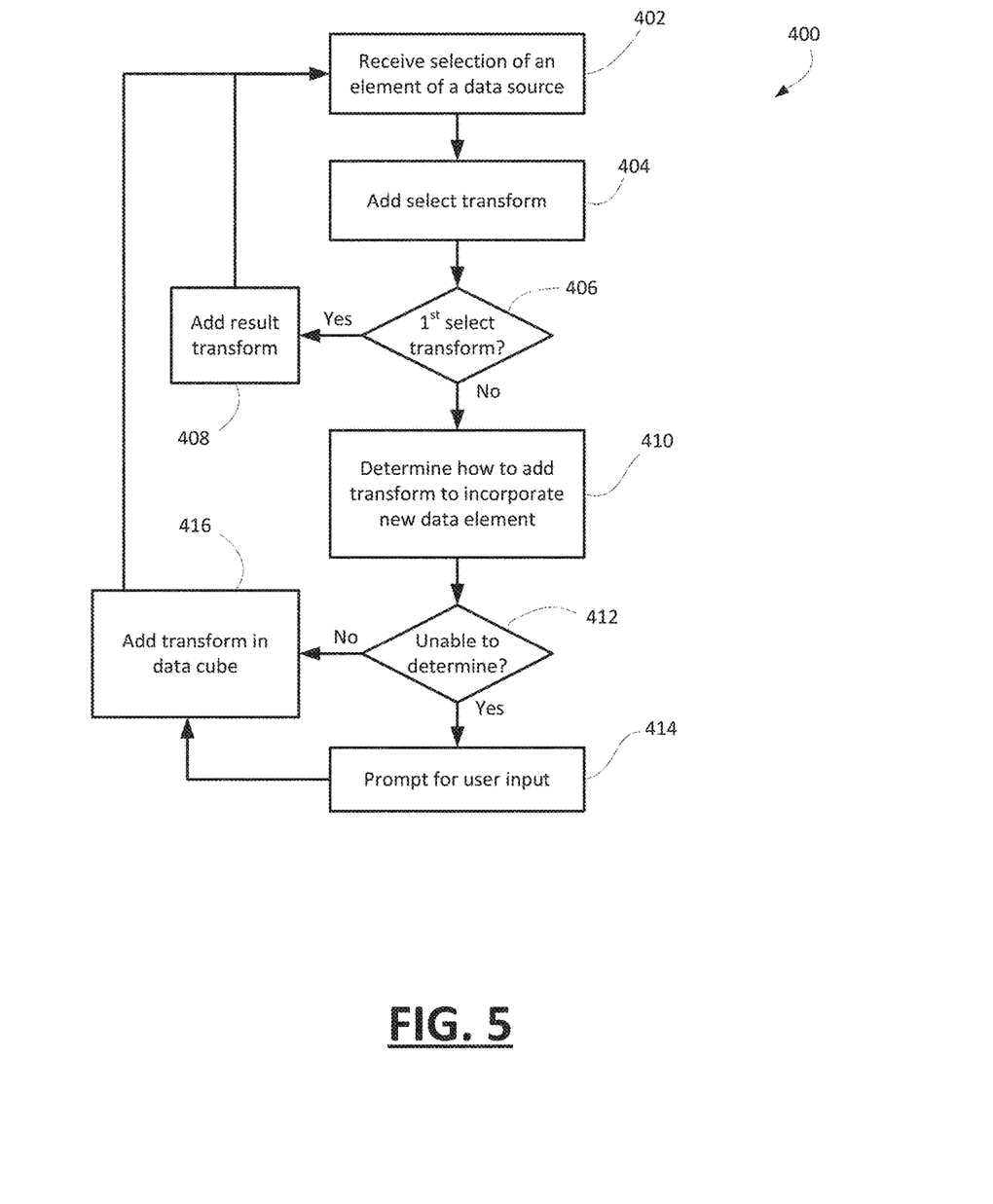
FIG. 5 shows, in flowchart form, one example method for generating a data cube.

Reference is now made to FIG. 5, which shows, in flowchart form, one example method 400 for generating a data cube. The method 400 is implemented in connection with a system that includes a networked collection of data sources and provides a graphical-user interface to enable user-generation of the data cube. The system receives, via the graphical-user interface, selection of a data element from one of the data sources in operation 402. In operation 404, the system creates a select transform for that data element.

The data element may include one or more measures or hierarchies. The data element may be a table, list, or other data structure from a database, an OLAP data source, a spreadsheet, or another data source.

In operation 406, the system determines whether this is the first select transform (i.e. the first data element) of this data cube. If so, then the system adds a result transform in operation 408. If not, then in operation 410 the system determines how to add a transform to integrate the new data element into the data cube. In many cases, this involves creating a transform to link the data element to one or more other data elements already in the data cube. In some example cases, the transform may be a join, union, intersect or other such set transform. Various fixed or "learning-based" logic rules may be used as the basis for selecting, inserting and configuring a suitable transform. In particular, as described above, the system may first look for a foreign key relationship. If one does not exist that links the new data element with another data element in the data view, then the system applies logic rules to determine the likely best basis for joining the new data element. This may include conducting various comparisons, such as between column headers, data types, etc. In one example implementation the priority for determining whether two columns match is:

1) Foreign key
2) Data type and name
3) Name
4) Data type
5) First location

In operation 412, the system determines whether it was able to determine a basis for adding the new data element. If not, then it prompts for user assistance in operation 414. In operation 416, the system adds or modifies the transforms in accordance with its determination or the user-provided specifications in order to add the new data element to the data cube.

Visualization Creation

Figure 4:
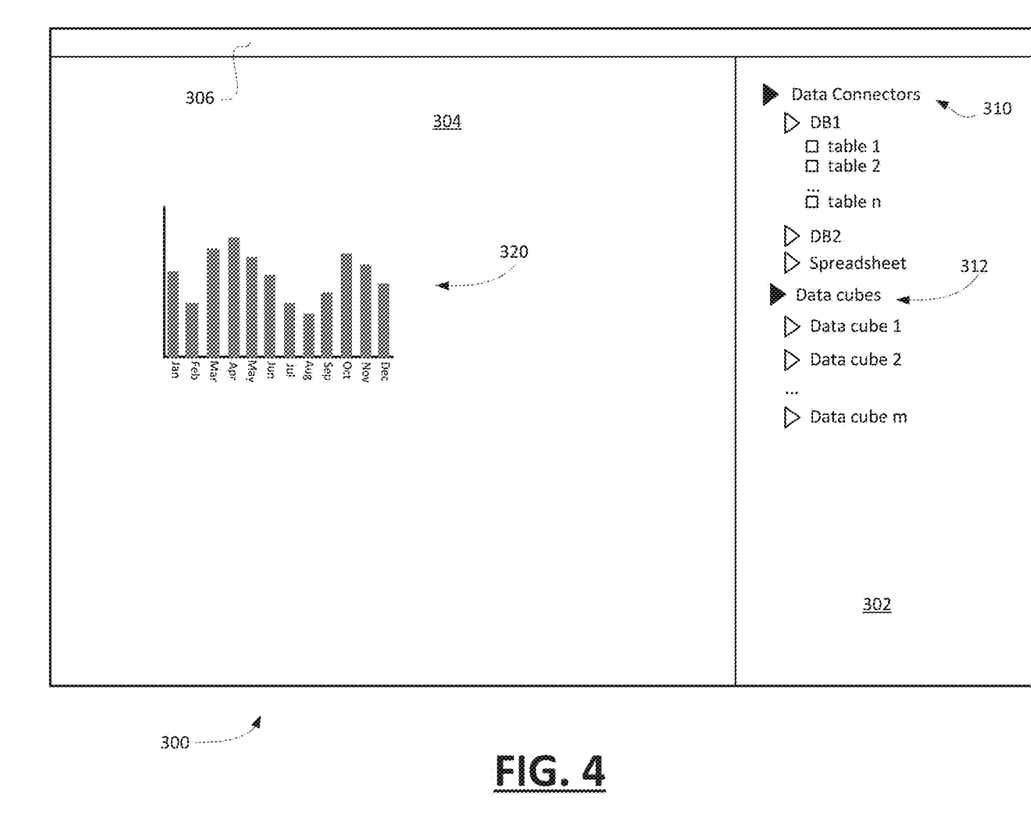
FIG. 4 shows one example embodiment of a visualization graphical user interface.

The system provides a visualization GUI to enable selection of measures and/or hierarchies for inclusion in a visualization. Reference is now made to FIG. 4, which shows one example embodiment of a visualization GUI 300. The visualization GUI 300 enables a user to graphically generate a visualization by dragging-and-dropping certain measures and hierarchies and specifying particular filters. The GUI 300 includes a source portion 302 that lists sources of data and data cubes. In particular, in this example, the source portion 302 shows a list of data connectors 310 available and a set of pre-created data cubes 312.

The GUI 300 includes a visualization page 304 upon which a visualization 320 may be created, edited and manipulated. It also includes a toolbar 306 to enable icon and menu-based editing and manipulation of elements of the visualization 320.

In one embodiment, the visualization 320 may be generated using an existing data cube 312 by dragging and dropping that data cube onto the visualization page 304. The user may then select a subset of the measures/hierarchies from that data cube, certain visualization parameters (filters, type of graph/chart, which elements on which axis of a graph, etc.) or manipulations (slice/dice, aggregate, etc.). The specified subset of measures/hierarchies that make up a visualization 320 may be termed a "metric set" in some instances. It is also referred to herein as the "visualization request". The metric set may also include information regarding assignment of the specified measures/hierarchies to specific axes, rows, columns, etc., in the visualization 320. Metric sets also encapsulate other information relevant to data retrieval including whether to retrieve missing data, how to display missing data, measure states information, and settings for sorting.

In some embodiments, the visualization 320 may be created without specifying a pre-built data cube 312, but rather by building the underlying data cube "on the fly", by directly dragging-and-dropping elements from the data connectors 310 onto the visualization page. As described above in connection with building data cubes, the system automatically prepares the underlying data cube through creating automatic joins (or other transforms) between different elements and/or sources. A user may be able to edit the basis for the joins, for example by user-specifying a key relationship between tables to override the system-generated key relationship.

Once a metric set/visualization request is created and configured in-memory in the system, the data retrieval operation may be initiated by the system. The visualization request guides the data retrieval operation since it specifies the needed measures and hierarchies, as well as parameters that may impact the necessary data, such as filters or other such manipulations specified in the visualization request. The system performs the data retrieval after carrying out an optimization process, as will be described below.

Data Cube Optimization

Figure 6:
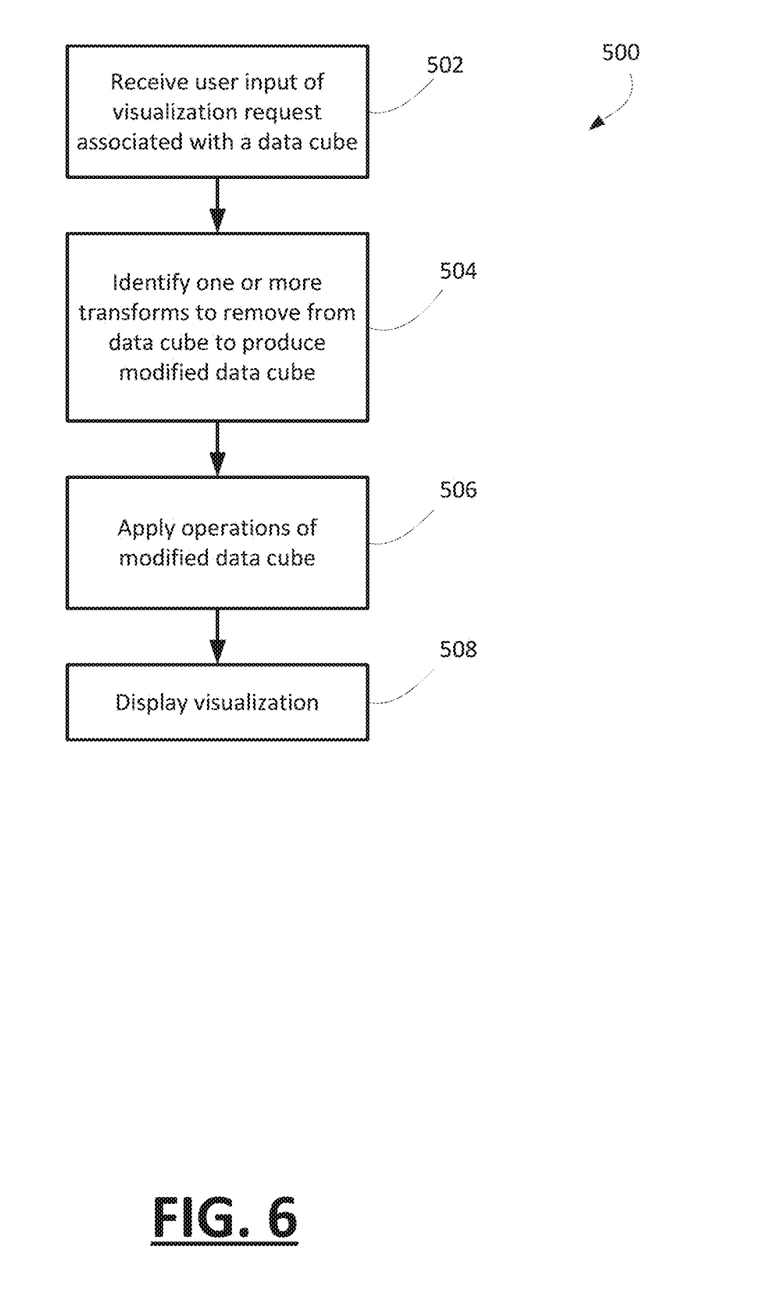
FIG. 6 shows, in flowchart form, one example method for optimizing execution of a data cube for a particular visualization request.

Reference will now be made to FIG. 6, which shows, in flowchart form, one example method 500 for optimizing execution of a data cube for a particular visualization request. The method 500 includes receiving a visualization request (alternatively termed a metric set) specifying one or more measures and/or hierarchies in operation 502. The visualization request is associated with a data cube. The data cube, as described above, specifies a data process (i.e. a set of interconnected transforms), including one or more select transforms for extracting data from one or more data sources. The data cube is capable of producing a data cube result having a plurality of measures and hierarchies. The visualization request identifies a subset of those measures and hierarchies with specified parameters (e.g. filtering, sorting, and paging) and associated properties, such as missing data points.

As noted above, the data cube may have been pre-built and selected when creating the visualization request. Alternatively, the visualization request may have been created by selection of data sources (or, more specifically, data elements of those data sources) and the data cube automatically generated in the background based on the selected data elements/sources.

In operation 504, the system identifies one or more transforms to remove from the data cube in order to produce a modified data cube. The identification of transforms to be removed is based on the visualization request. Because the visualization request does not necessarily require all of the measures and hierarchies that would otherwise be created in the data cube result, the system may be able to eliminate (i.e. ignore) some of the transforms.

In addition to eliminating transforms because they are not needed, the system may also be able to configure the data providers to implement certain manipulations that are currently being implemented by way of transform in the data cube. If a transform operation can be implemented via the data provider such that it becomes embedded as part of the data source query, it is typically carried out faster and more efficiently than through a later transform within the system. The extent to which a data cube transform may be incorporated into a data provider query depends, in part, upon the nature of the transform and the capabilities of the data provider. For example, some providers may be capable of carrying out aggregation operations (such as SUM, COUNT, MAX), filtering (e.g. WHERE), subset operations (e.g. Top100), or distinct operations, directly within the query itself. Some data providers, however, are not necessarily capable of incorporating some or all of these operations into a query.

In operation 506, the modified data cube is executed by applying the transforms in order to generate the data cube result, which exposes (via the result transform) measures and hierarchies, including the measures and hierarchies specified in the visualization request.

In operation 508, the visualization is rendered based on the data results obtained from the data cube in accordance with the visualization request.

Figure 7:
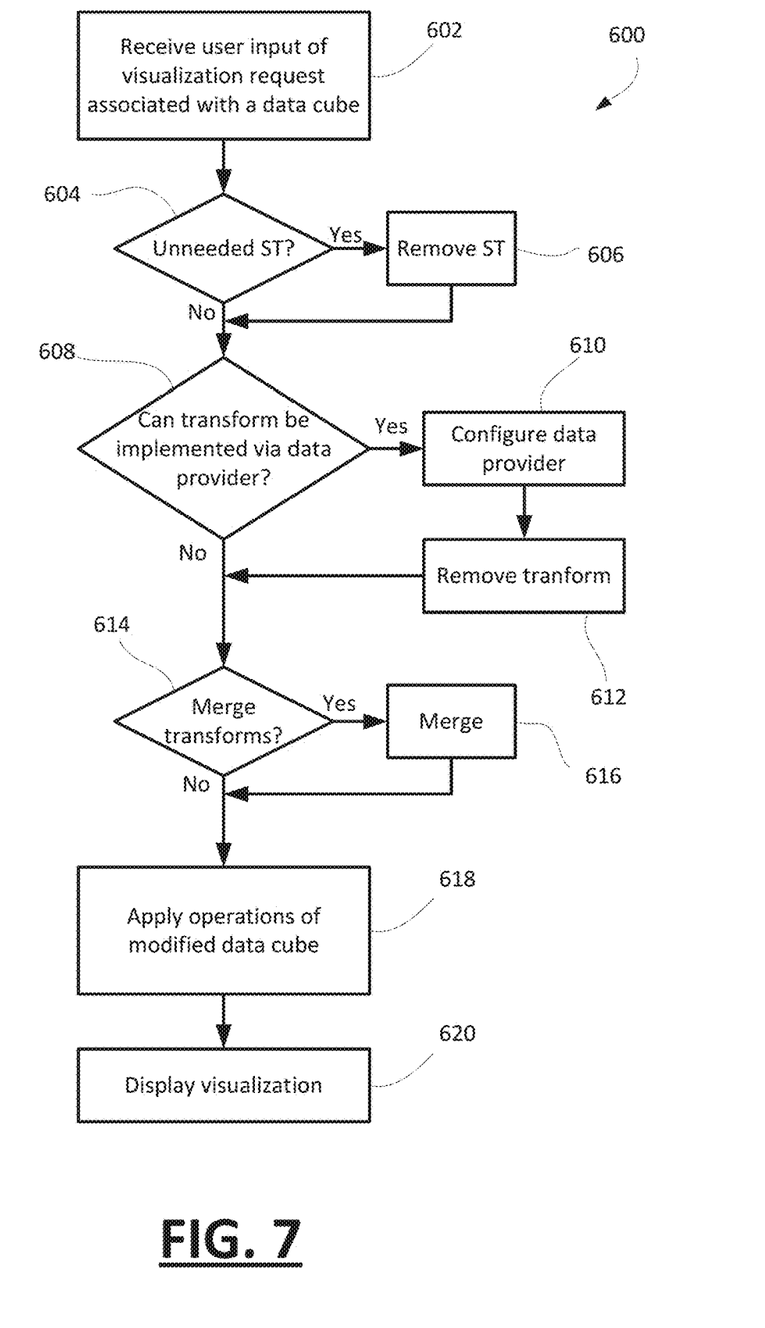
FIG. 7 shows, in flowchart form, another example method for optimizing a data cube.

Reference will now be made to FIG. 7, which shows, in flowchart form, another example method 600 for optimizing a data cube. The method 600 includes receiving the visualization request associated with a data cube. The system then determines, based on the measures and hierarchies specified by the visualization request and the structure of the data cube, whether there are any select transforms that may be eliminated in operation 604. This may not be as straightforward as eliminating any select transforms that do not directly select measures/hierarchies specified in the visualization request, since other data sources may provide linking data, or data that is aggregated or otherwise manipulated such that it influences the measures and hierarchies that are referenced by the visualization request. Accordingly, the system evaluates the data cube structure, i.e. the data process, and steps through its hierarchy of transforms to identify whether any select transforms are unnecessary in light of the visualization request. If so, then in operation 606 the system removes/ignores those select transforms.

In operation 608, the system determines whether any of the transforms may be implemented at the data provider level, i.e. whether the transform operation may be incorporated into the data source query. If so, then in operation 610 the applicable data provider is configured so as to implement the transform operation and in operation 612 the redundant transform is eliminated from the data cube.

In operation 614, the system determines whether any of the transforms may be merged. If so, then in operation 616 the transforms are merged, which may include re-configuring one of the transforms to incorporate the operation of the other transform and deleting/ignoring the other transform.

Operations 604-616 result in a modified data cube. It will be understood that in some instances a data cube may not always be changed by the method 600, for example, in a case in which the visualization request and data providers are such that no optimizations are possible.

In operation 618 the modified data cube is processed to generate the data cube result and in operation 620 the visualization is rendered based on the measures and hierarchies obtained from the data cube result and in accordance with the visualization parameters specified in the request.

Client-Server Model

In many embodiments, the system is implemented using a client-server model. In some client-server business intelligence systems, particularly when using a web-based interface, it is impractical or undesirable to provide the client side with full data points for a set of measures and hierarchies (e.g. a metric set), since in some situations it can involve a huge quantity of data, much of which may not be required for rendering the visualization. Accordingly, in some systems the server creates the visualization, renders it as an image, and provides the image to the client-side for display. This limits the client-side ability to manipulate and requires that the server render and send a new visualization image with every requested change.

In some embodiments, of the present application, the rendering is done at the client-side using the data points so that the visualization is responsive and interactive.

Figure 8:
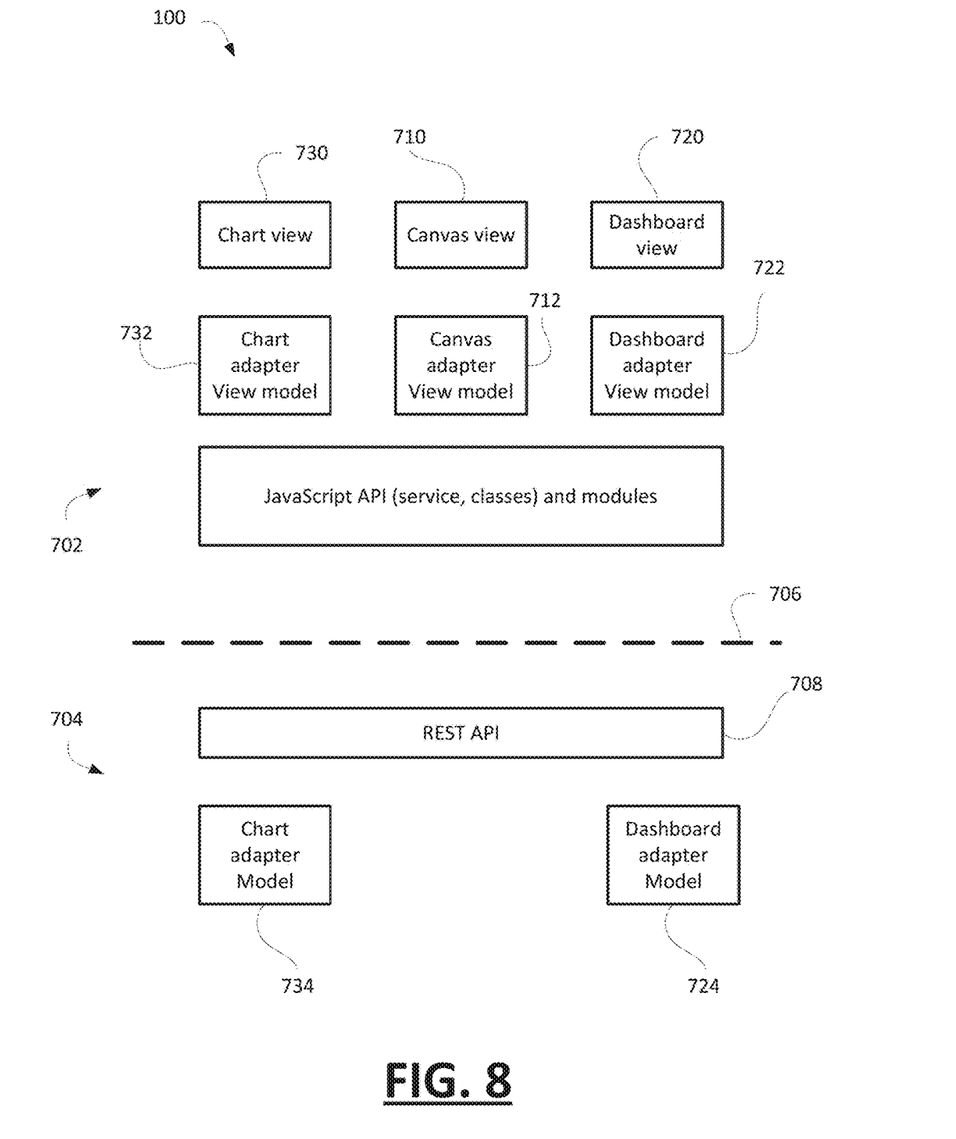
FIG. 8, which shows, in block diagram form, an example embodiment of the system in a client-server architecture.

Reference will now be made to FIG. 8, which shows a block diagram at a high-level of one example of the system 100. The diagram illustrates some of the elements and modules comprising the client-side 702 and server-side 704 of the system 100. The example client-side modules may be implemented using standard web technologies (e.g., HTML, CSS, SVG, JavaScript) and execute within a web browser on a client device. Server-side modules may generally execute on a web server computer in this example.

Communication between the client-side and server-side of system 104 occurs across a network 706 through a REST API 708 using the HTTP protocol and JSON as a data format, for example.

The architecture of the system 100 may be based on a M1-V1-VM1-V2-VM2 design pattern (i.e., a MVVM-VVM or Model View ViewModel—View ViewModel pattern). In this example, a Canvas View 710 represents a graphical design surface where users add and arrange graphical elements, hierarchies, metric sets, and data visualization controls in order to create visualizations such as dashboards, reports, scorecards, and small multiples. Corresponding to the Canvas View 710 is a client-side Canvas Adapter (i.e., view model) 712 which abstracts the canvas from the model (i.e., adapter). The canvas produces the layout and visuals according to the canvas view model.

The Dashboard View 720 represents a data visualization view such as a dashboard, report, scorecard, or small multiples. Corresponding to the Dashboard View 720 is a client-side Dashboard Adapter (i.e., view model) 722 and a server-side Dashboard Adapter (i.e., model) 724. The canvas accesses the dashboard view for positioning information.

A Chart View 730 is an example of a single data visualization control on a dashboard, report, scorecard, or small multiples view. Corresponding to the Chart View 730 is a client-side Chart Adapter (i.e., view model) 732 and a server-side Chart Adapter (i.e., model) 734. The chart view model abstracts the model (i.e., adapter) from the view (i.e., chart). The chart view model also stores settings that are chart-specific.

The data that is returned to a client-side for display on a data visualization control is organized in the form of a cellset, which is a data structure consisting of hierarchy members (e.g., products or sales territories) and cells (which contain aggregated measure values). Each cell in a cellset has two tuples as coordinates: a row tuple and a column tuple.

The client-side receives the data result, does a first pass to clean up the cellset, matches it to the original request, and returns it to the correct adapter. The adapter then does a second pass to perform a merge if it was a paged request, joining the cellsets together into a single larger cellset. Finally, the adapter does the work to actually make the visualization (e.g., a chart) show the new data by converting the cellset into a format that each individual data visualization control understands.

In order to avoid overwhelming either the client-side 702 or the network 706 bandwidth with excessive data, the server-side 704 may perform certain simplification operations in some embodiments. Note that the below-described simplification operations are distinct from the optimization process described above and may be performed in addition to optimization. The simplification operations to reduce the data quantity in light of client-side parameters, yet still provide the client-side with data points for specific visualizations rather than rendering and sending a static image. This permits the client-side greater interactivity such as, for example, animated transitions during data changes, full context for data points, drill down, filtering or custom scripts.

A visualization request from the client-side to the server-side may, therefore, specify a number of parameters in addition to the data cube and desired measures/hierarchies. The visualization request may provide client-specific rendering parameters, including visualization type (e.g. bar chart, line graph, scatter plot, etc.) and settings for each series of data points, and rendering parameters such as pixel size/range and other display parameters. In particular, a data request from a data visualization adapter may indicate that a visualization with simplification enabled is making the request, and may include a copy of all applicable settings and the pixel size at which the final image will be rendered.

For example, applicable chart settings include the chart type for each series of data points, where each series may be a different chart type, and where each type of chart data point may be rendered and connected to other data points very differently causing different data points to be completely visually obscured by others. Accordingly, chart type-specific positioning settings and data point appearance settings that may have an effect on which data points are visible or not directly visible are included with the data request.

For instance, bar charts display each data point separately, so a vertical bar that would be rendered below another bar within the same horizontal pixel can safely be left out without impacting the visual. Bars may be stacked, so that if a stacked bar data point has a value too small to be displayed with an entire pixel of height relative to the total available pixel height, it may be left out; but data points that were originally stacked above it must be given their original stacked value to preserve accurate positioning and values with a more limited set of data points at the client.

Line, area and range charts display a connecting line between each data point, so that consecutive data points all positioned within a single pixel along one axis must at minimum connect with data points in any preceding or following pixel from the correct perpendicular pixel, as well as include the "highest" and "lowest" perpendicular points. These chart types are also capable of displaying discrete data points, each displayed as a single horizontal or vertical line or range across the entire plotting area, or a rectangular range defined by four bounding positions, in which case data points displayed entirely beneath others may be left out.

Scatter plots and bubble charts may display symbols on top of each other, which may be semi-transparent and additive so that more semi-transparent data points all co-located at the same position appear darker than fewer data points at another position.

Data points for all chart types are positioned along axis scales using certain values. Users editing a visualization are able to customize exactly which measures and hierarchies are used to plot data points along each axis as well as bubble size, and these settings may be included with the data request sent to the server-side 704. The type of scales along the axes used to position values and any settings that might cause data points to be displayed farther apart from each other in separate pixels (rather than closer together) are included as well. Data points will be positioned differently depending on whether the scale type is linear numeric or logarithmic, or if dates are plotted along a linear time axis versus sequentially with equal space given to each distinct value.

Data points are plotted within a rectangular area known as the plotting area, on the inside of all axes and within any padding reserved outside of the axes. Typically, elements such as axis labels, titles and tick marks are displayed along the outside of each axis and space is automatically reserved for them within the total set pixel boundaries of the chart. This means the exact size of the plotting area within the axes is dependent upon many factors such as the browser's font rendering engine, the client computer's installed and available fonts, the set font size, axis label formatting settings including the user's current culture, etc. In some embodiments, rather than attempting to account for all these client-side 702 specific settings, the data is simplified as if the plotting area were expanded to the total pixel size of the chart even if it is likely to be smaller when rendered at the client-side 702, which means a somewhat larger number of data points may be included in the data result than is strictly required.

Simplification is accomplished with code at the server that, based on relevant chart settings and data mappings, determines the pixel positions of data points for each chart type along the current axis scale types, and removes cells and tuples from each cellset that were not referenced by any data point determined to be completely or partially visible. Any given row, column, or any given cell at some intersection of a row and column may be removed, to reduce the quantity of data sent to the client-side 702, and the amount of network traffic.

Subquery Paging

Sequence paging may be used by table visualizations that display a contiguous block of rows and columns with scrollbars, where a "page" (or a limited number of pages near the current intersection of visible rows and columns) is requested to load only the data needed for displaying. The same paging is used for charts when zoomed in along one axis with a scrollbar, which is similar to a table with one scrollbar. When zoomed into a chart displaying data along numeric, logarithmic or date/time scales, the data points that are visible at any given time are not necessarily in contiguous rows in the cellset, since the order of the data points can be completely independent from the order of values plotted by the scale. Accordingly the present system employs subquery paging to request a "page" defined by a range of numeric or date/time values plotted along each axis that is zoomed in and scrolled, where the current visible area is converted into a range as part of a data request.

It will be understood that the system described herein and any module, routine, process, thread, or other software component implementing the described method/process executed by the system may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A method of producing, in a data visualization system, a real-time data visualization for display, the method comprising:
- receiving selection of two or more data elements from one or more data sources;
- generating a data cube, wherein the data cube comprises a set of transforms to be applied to the two or more data elements, the set of transforms including a select transform for each of the two or more data elements, one or more operator transforms, and a result transform, and wherein processing of the data cube is to result in a data cube result having a plurality of measures and one or more hierarchies;
- receiving a visualization request associated with the data cube, the visualization request including a metric set specifying one or more of the measures and hierarchies of the data cube and visualization parameters;
- automatically identifying, based on the visualization request, one or more transforms within the data cube to remove from the data cube for the purpose of the visualization request to produce a modified data cube;
- carrying out the transforms of the modified data cube to produce a modified data cube result;
- obtaining said one or more of the measures and hierarchies from the modified data cube result based on the visualization request; and
- displaying said one or more of the measures and hierarchies as a visualization on a display.

2. The method claimed in claim 1, wherein identifying includes:
- determining that a data provider associated with one of the data sources has the capability to implement one of the transforms;
- configuring said data provider to implement said one of the transforms; and
- removing said one of the transforms from the data cube.

3. The method claimed in claim 1, wherein identifying includes:
- determining that one of the transforms produces output data that is not required for the visualization request; and
- removing said one of the transforms from the data cube.

4. The method claimed in claim 1, wherein generating the data cube includes automatically determining a transform for connecting a data element to one or more other data elements within the data cube.

5. The method claimed in claim 4, wherein the transform comprises a join between the data element and an existing data element within the data cube, and wherein determining includes determining a basis for the join operation.

6. The method claimed in claim 5, wherein determining a basis includes determining based upon, in order of priority, any foreign key relationship specified in the respective data sources, a user-specified relationship, or a system-determined relationship.

7. The method claimed in claim 6, wherein the basis is determined based on the system-determined relationship, and wherein said join is a join of a column from the data element with a column from the existing data element, and wherein the system-determined relationship for joining the two columns is based upon one of data type, header, or location.

8. The method claimed in claim 1, further comprising simplifying the modified data cube result, and wherein simplifying includes identifying data points that will not be visible and filtering out those data points.

9. The method claimed in claim 8, wherein the visualization request includes visualization type settings and display parameters, and wherein identifying comprises determining which data points will not be visible in the visualization based upon the visualization type settings and display parameters.

10. The method claimed in claim 1, wherein the data sources include two or more of a relational database, an OLAP database, a spreadsheet, or a web service.

11. A non-transitory processor-readable medium storing processor-executable instructions which, when executed, configure one or more processors to perform the method claimed in claim 1.

12. A data visualization system to produce real-time data visualizations for display, comprising:
- a plurality of data sources;
- a server including
  - a network connection to a client device to receive selection of two or more data elements from one or more of the data sources, and to receive a visualization request, and
  - a data cube processor to generate a data cube, wherein the data cube comprises a set of transforms to be applied to the two or more data elements, the set of transforms including a select transform for each of the two or more data elements, one or more operator transforms, and a result transform, and wherein processing of the data cube is to result in a data cube result having a plurality of measures and one or more hierarchies,
- wherein the visualization request is associated with the data cube and includes a metric set that specifies one or more of the measures and hierarchies of the data cube and visualization parameters;
- and wherein the data cube processor is to automatically identify, based on the visualization request, one or more transforms within the data cube to remove from the data cube for the purpose of the visualization request to produce a modified data cube, and to carrying out the transforms of the modified data cube to produce a modified data cube result,
- and whereby the client device obtains said one or more of the measures and hierarchies from the modified data cube result based on the visualization request and displays said one or more of the measures and hierarchies as a visualization on a display.

13. The data visualization system claimed in claim 12, the data cube processor identifies one or more transforms to remove by:
- determining that a data provider associated with one of the data sources has the capability to implement one of the transforms;
- configuring said data provider to implement said one of the transforms; and
- removing said one of the transforms from the data cube.

14. The data visualization system claimed in claim 12, the data cube processor identifies one or more transforms to remove by:
- determining that one of the transforms produces output data that is not required for the visualization request; and
- removing said one of the transforms from the data cube.

15. The data visualization system claimed in claim 12, wherein the data cube processor generates the data cube by automatically determining a transform for connecting a data element to one or more other data elements within the data cube.

16. The data visualization system claimed in claim 15, wherein the transform comprises a join between the data element and an existing data element within the data cube, and wherein automatically determining includes determining a basis for the join operation.

17. The data visualization system claimed in claim 16, wherein determining a basis includes determining based upon, in order of priority, any foreign key relationship specified in the respective data sources, a user-specified relationship, or a system-determined relationship.

18. The data visualization system claimed in claim 17, wherein the basis is determined based on the system-determined relationship, and wherein said join is a join of a column from the data element with a column from the existing data element, and wherein the system-determined relationship for joining the two columns is based upon one of data type, header, or location.

19. The data visualization system claimed in claim 12, wherein the server includes a simplification process to simplify the modified data cube result prior to sending the modified data cube result to the client device in response to the visualization request, and wherein simplifying includes identifying data points that will not be visible and filtering out those data points.

20. The data visualization system claimed in claim 19, wherein the visualization request includes visualization type settings and display parameters, and wherein identifying comprises determining which data points will not be visible in the visualization based upon the visualization type settings and display parameters.

21. The data visualization system claimed in claim 12, wherein the data sources include two or more of a relational database, an OLAP database, a spreadsheet, or a web service.

* * * * *